Figure 1:
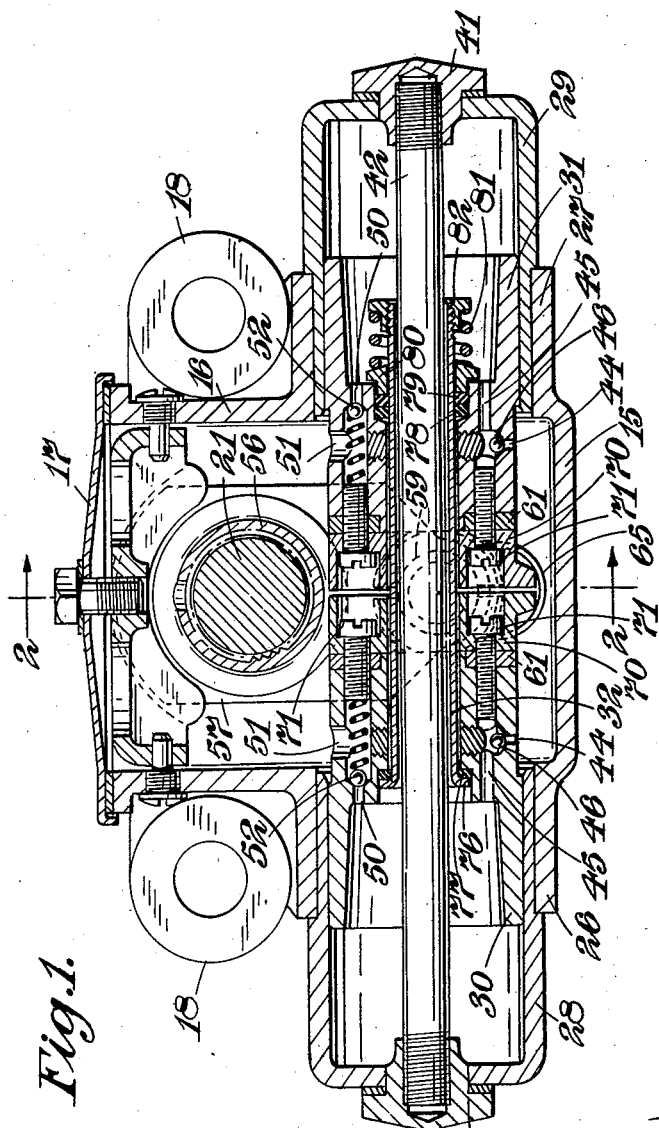

June 15, 1943.  E. W. JOHNSON  2,321,818
SHOCK ABSORBER
Filed Sept. 18, 1942  2 Sheets-Sheet 1

Inventor
Ernest Wm Johnson
By Watson, Cole, Grindle &
Watson
Attorneys

June 15, 1943.    E. W. JOHNSON    2,321,818
SHOCK ABSORBER
Filed Sept. 18, 1942    2 Sheets-Sheet 2
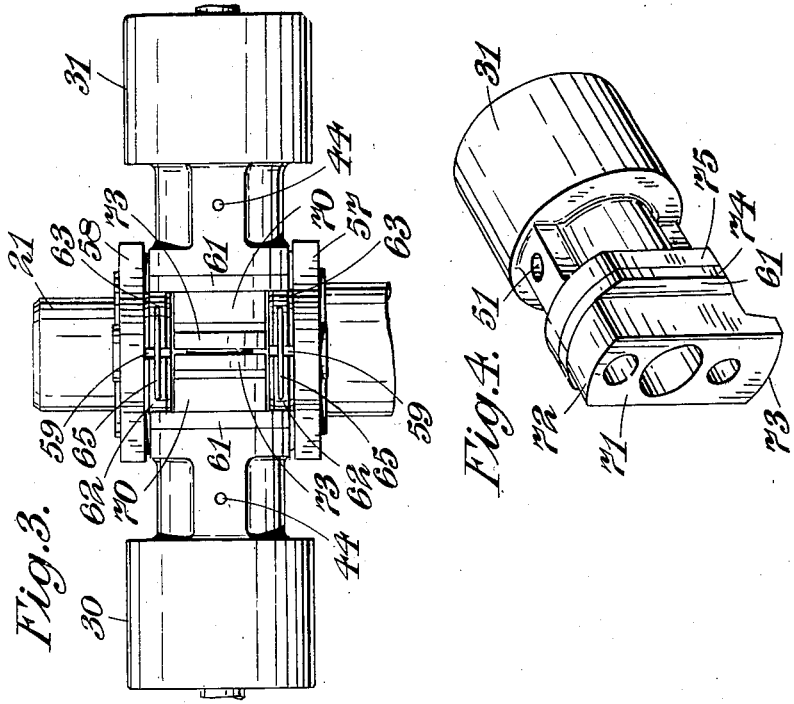
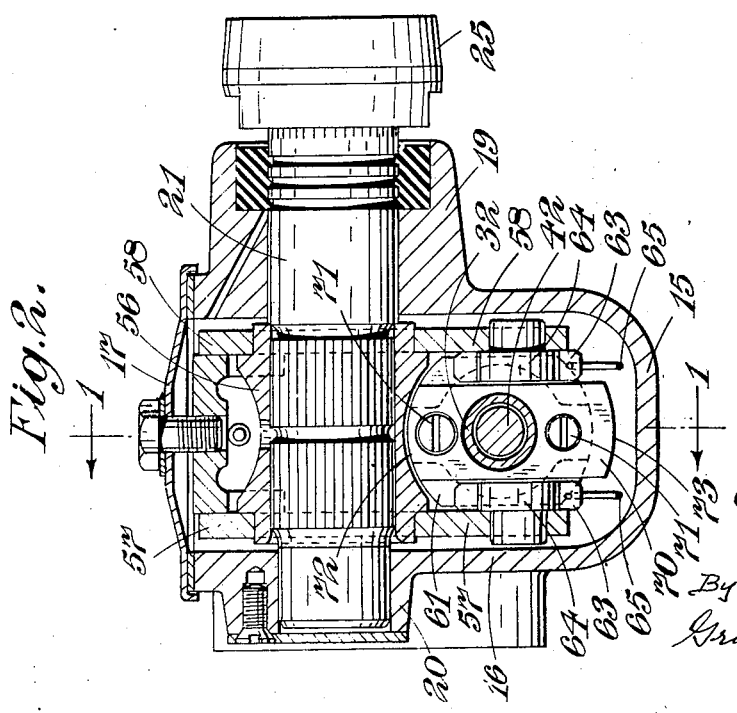
Inventor
Ernest Wm Johnson
By Watson, Cole, Grindle & Watson
Attorneys Patented June 15, 1943

2,321,818

UNITED STATES PATENT OFFICE 2,321,818

SHOCK ABSORBER

Ernest William Johnson, Birmingham, England, assignor of one-half to Vandervell Products Limited, London, England, a British company Application September 18, 1942, Serial No. 458,877
In Great Britain October 8, 1941

4 Claims. (Cl. 188—88)

This invention is for improvements in or relating to shock absorbers, and is concerned with shock absorbers of the type in which a restricted passage for the flow of the damping fluid is provided between the opposed surfaces of the bore of a piston-carrying sleeve and a metering rod which reaches into said bore in such manner that the piston and sleeve reciprocate along the metering rod inside the shock absorber casing, and in which the piston comprises two piston heads which are separate members and are drawn together on the sleeve by a spring and are prevented from turning relatively to each other about the sleeve, the adjacent ends of which piston heads are embraced by the side plates of a rock arm on a rock shaft which transmits the shock to, and the damping effort from, the piston by means of bosses or rollers on the inner faces of rock arm side plates, and the curved faces of which bosses or rollers, or bearing rings surrounding the same, engage endwise directed shoulders on the piston heads and maintain connection between the rock arm and piston during the oscillation of the former and the reciprocation of the latter.

The invention has for one of its objects to provide a more convenient and efficient construction than has heretofore been available.

According to the invention there is provided a shock absorber of the above type which is characterised in that the parts of each piston head which are opposite to the ends of the said bosses or rollers are flat and parallel to each other and to the direction of piston reciprocation, and when the parts are assembled are embraced by the ends of said bosses or rollers or of the bearing rings surrounding the same. This arrangement will enable the ends of the said bosses or rollers or of the bearing rings surrounding the same to prevent the piston heads from turning at all.

According to another feature of the invention the lateral surface of each piston head between one lateral extremity of the pair of flats is spaced further from the longitudinal piston axis than is the corresponding surface between the other lateral extremity of the pair of flats. This constructional feature will be found an advantage in that it will prevent the incorrect assembly of the parts. For correct assembly the piston heads must lie more closely to the hub of the rock arm than would be possible if the lateral surface of the piston head first mentioned were to be directed towards this hub. This feature is of particular advantage in applying the invention to a construction such as is shown in applicant's United States specification Serial No. 389,249, Patent No. 2,297,562, wherein the piston heads have valve-controlled passages at their upper and lower portions which will not operate properly if the pistons are assembled the wrong way up.

It is convenient to make the sleeve, in a shock absorber of the type above described, a slack fit in the bore of the piston heads and to provide a flexible sealing washer between each end of the sleeve and the corresponding end of the piston head, which washers are subjected to the endwise spring pressure which draws the piston heads together. This arrangement will ensure that there will be no leakage between the sleeve and the piston heads but that the parts will be able to adjust themselves to any errors in alignment which may develop. Furthermore it will not be necessary to machine the outside of the sleeve.

For a more complete understanding of the invention there will now be described, by way of example only and with reference to the accompanying drawings, one constructional form of shock absorber according to the invention. It is to be understood, however, that the invention is not restricted to the precise constructional details set forth.

In these drawings:

Figure 1 is a sectional elevation on the line 1—1 of Figure 2 showing a double-acting shock absorber according to the invention. This figure corresponds in some respects to Figure 1 of specification Serial No. 389,249, Figure 2 is a vertical cross-section on the line 2—2 of Figure 1. This figure corresponds in some respects to Figure 2 of specification Serial No. 389,249, Figure 3 is an underplan of the pistons and certain associated parts shown in Figures 1 and 2, and Figure 4 is a perspective view of a single piston with certain of the parts which are attached to it.

Like reference numerals indicate like parts throughout the drawings.

The double-acting shock absorber shown in the drawings is similar in many respects to the one described in specification Serial No. 389,249 and comprises a casing 15 which will usually be made of metal but in some circumstances may be made of plastic moulded material such, for instance, as that sold under the registered trademark "Bakelite." This casing is not subjected to any pressure from the shock-absorbing fluid and thus it is not essential to employ metal in its construction. The casing 15 has an upstanding centre barrel 16 which is provided at the top with a cover plate 17. At its sides it has lugs 18 to receive securing bolts whereby it may be mounted in place. Also projecting from the barrel 16 are bosses 19 and 20 which constitute bearings for a rock shaft 21. Outside the casing 15 the rock shaft 21 has secured to it one end of an arm 25. The other end (not shown) of this arm is connected to one of the parts to be controlled by the shock absorber and the lugs 18 are bolted to the other of said parts.

The casing 15 also has two aligned bosses 26 and 27 which are bored to receive cylinders 28 and 29 constituting the fluid containers. The cylinders 28 and 29 will usually be made of metal, and their interiors are bored to receive pistons 30 and 31 which may be made of metal or of moulded plastic material such, for instance, as that sold under the registered trade-mark "Bakelite." The pistons are separate from each other and are received upon a sleeve 32. The pistons are not necessarily a close fit upon the exterior of the sleeve 32 but a close joint or seal is made between each piston and the appropriate end of the sleeve.

The outer ends of the cylinders 28 and 29 are inturned and bored to receive end caps 40 and 41, into both of which a metering rod 42 is screwed. Thus the rod 42 relieves the casing 15 from endwise stress, and when the end caps are screwed home on the metering rod, the latter serves to hold the cylinders 28 and 29 in place in the casing 15. The metering rod 42 reaches right through the interior of the sleeve 32 and the restricted passage through which the damping fluid passes between the cylinders 28 and 29 lies between the opposed surfaces of the sleeve 32 and the metering rod 42.

The centre barrel 16 of the casing constitutes a recuperator chamber from which there is made up any loss of damping fluid from the two cylinders. To afford the requisite communication, each piston is formed with ducts 44 and 45 whereof the duct 44 is controlled by a non-return valve 46.

To prevent damage occurring by reason of excessive pressure developing in the cylinders 28 and 29, relief ducts 50 and 51 are provided, whereof the duct 50 is controlled by a spring-pressed valve 52.

Inside the casing 15 there is attached to the rock shaft 21 a built-up rock arm comprising a barrel 56 upon the ends of which two parallel plates 57 and 58 are secured. These plates 57 and 58 reach down to the pistons 30 and 31 and are provided with bosses 59 on their inner faces. The bosses 59 are intended to transmit the oscillatory movement of the rock arm to the pistons and, conversely, to transmit the reciprocatory movement of the pistons to the rock arm. To minimise the effects of wear, the inner faces of the pistons are provided with guide plates 61 and between them and the bosses 59 bearing members are interposed which rock on the bosses 59 and which are each in two separated portions 62 and 63. The members 62 and 63 in a pair are located on opposite sides of a boss 59 but do not completely surround it. They have flatted surfaces 64 which engage the guide plates 61. The members 62 and 63 in a pair are connected by a light spring 65.

As thus far described the construction corresponds to that of specification Serial No. 389,249 but it has been necessary to include this general description herein in order that the features of the present invention may be properly understood. In the construction of specification Serial No. 389,249 the adjacent ends of the pistons 30 and 31 are formed with interlocking shoulders to prevent the pistons turning relatively to each other but in the construction according to the present invention a block 70 is secured to the inner end of each piston by screws 71 which also serve to secure the guide plates 61 aforesaid in position. These blocks 70 are flatted where they lie opposite to the members 59, 62 and 63, the flats lying parallel to each other and to the direction of piston reciprocation. Thus the end faces of the members 59 or of the members 62 and 63, whichever stands proud, can be utilised to engage the flats on the blocks 70 and prevent the pistons from turning at all. The curved surfaces 72 and 73 of the blocks 70 are at different distances from the piston axis, the surface 72 being nearer than the surface 63. The surface 72 is intended to be uppermost and, when the pistons are assembled, lies closely under the barrel 56 of the rock arm. The amount of space available is such that it is impossible for the pistons to be assembled with the surfaces 73 uppermost. This arrangement is adopted in order to prevent the pistons being so assembled as to bring the ducts 44 to the top and the ducts 51 to the bottom. The flatted surfaces 74 and 75 respectively on the plates 61 and the inner ends of the pistons are provided in order to clear the side plates 57 and 58 of the rock arm.

To maintain the pistons 30 and 31 and the sleeve 32 properly assembled, the latter has at one end a head 76 between which and the adjacent surface of the piston 30 there is a flexible washer 77 which at that end seals the clearance between the sleeve and the bore of the piston. The piston 31 has towards its outer end an enlarged bore with a conical base to house two flexible washers 78 and 79 which are placed face to face about the sleeve and are retained in position by a stuffing box gland 80 with a coned outer end to centralise a spring 81 which is coiled about the exposed end of the sleeve between the gland 80 and a nut 82 on the sleeve. This spring 81 draws the two pistons together and also maintains the flexible washers 77, 78 and 79 in sealing position without interfering with their flexion in order to allow the parts to accommodate themselves to irregularities, since the sleeve may, as mentioned above, be only a slack fit in the bores in the pistons. Any suitable form of flexible washer may be employed but it will be understood that it should be capable of allowing more relative movement between the parts than would be permitted by the packings shown in Figure 1 of specification Serial No. 389,249.

It will be understood that the dimensions of the members 62 and 63 are such that by virtue of their engagement with the plates 61, the opposed faces of the blocks 70 will not be able to make contact with each other under the pressure of the spring 81. There will thus not be any slack connection between the rock arm and the pistons.

It is to be understood that the invention is not restricted to the precise constructional details set forth.

I claim:

1. In a shock absorber in which fluid friction is employed for damping, the combination of a casing embodying two fluid containers, two piston heads, one reciprocable in each container, and each piston head having a perforation extending through it from end to end, a metering rod enclosed within said casing, which rod reaches into the perforations in such manner that the piston heads reciprocate along the metering rod, a single sleeve interposed between the metering rod and the perforations in the piston heads in such manner that the opposed surfaces of the sleeve and the metering rod provide between them a restricted passage connecting the said fluid containers, through which passage the fluid is forced by the said piston heads, means for mounting the piston heads separately on the sleeve so that the latter shall partake of the reciprocation of the piston heads, spring means for urging the piston heads towards each other along the sleeve, a rock shaft which transmits the shock and the damping effort, means for mounting said shaft in the casing, a barrel, means for mounting said barrel on the rock shaft inside the casing, two parallel plates together constituting with the barrel a rock arm, which plates are located one at each end of said barrel in such manner that they reach out to embrace the adjacent ends of the piston heads which are formed with flat lateral faces parallel to each other and to the direction of piston reciprocation, and bosses so located on the inner faces of said plates that the inner ends of the bosses lie opposite to the said flat lateral faces on the piston heads and prevent the latter from turning, which piston heads also have endwise-directed faces in such position as to lie opposite to the curved faces of the bosses on the rock arm and to maintain engagement with the bosses during the rotary movement of the arm and the corresponding reciprocatory movement of the piston heads.

2. In a shock absorber in which fluid friction is employed for damping, the combination of a casing embodying two fluid containers, two piston heads, one reciprocable in each container, and each piston head having a perforation extending through it from end to end, a metering rod enclosed within said casing, which rod reaches into the perforations in such manner that the piston heads reciprocate along the metering rod, a single sleeve interposed between the metering rod and the perforations in the piston heads in such manner that the opposed surfaces of the sleeve and the metering rod provide between them a restricted passage connecting the said fluid containers, through which passage the fluid is forced by the said piston heads, means for mounting the piston heads separately on the sleeve so that the latter shall partake of the reciprocation of the piston heads, spring means for urging the piston heads towards each other along the sleeve, a rock shaft which transmits the shock and the damping effort, means for mounting said shaft in the casing, a barrel, means for mounting said barrel on the rock shaft inside the casing, two parallel plates together constituting with the barrel a rock arm, which plates are located one at each end of said barrel in such manner that they reach out to embrace the adjacent ends of the piston heads which are formed with flat lateral faces parallel to each other and to the direction of piston reciprocation, bosses on the inner faces of said plates and bearing members rockable on said bosses, which bosses and bearing members are so located on the inner faces of said plates that the inner ends of the bosses and bearing members lie opposite to the said flat lateral faces on the piston heads and prevent the latter from turning, and which piston heads also have endwise-directed faces in such position that the bearing members are interposed between them and the curved faces of the bosses on the rock arm so as to maintain engagement with the bosses during the rotary movement of the arm and the corresponding reciprocatory movement of the piston heads.

3. In a shock absorber in which fluid friction is employed for damping, the combination of a casing embodying two fluid containers, two piston heads, one reciprocable in each container, and each piston head having a perforation extending through it from end to end, a metering rod enclosed within said casing, which rod reaches into the perforations in such manner that the piston heads reciprocate along the metering rod, a single sleeve interposed between the metering rod and the perforations in the piston heads in such manner that the opposed surfaces of the sleeve and the metering rod provide between them a restricted passage connecting the said fluid containers, through which passage the fluid is forced by the said piston heads, means for mounting the piston heads separately on the sleeve so that the latter shall partake of the reciprocation of the piston heads, spring means for urging the piston heads towards each other along the sleeve, a rock shaft which transmits the shock and the damping effort, means for mounting said shaft in the casing, a barrel, means for mounting said barrel on the rock shaft inside the casing, two parallel plates together constituting with the barrel a rock arm, which plates are located one at each end of said barrel in such manner that they reach out to embrace the adjacent ends of the piston heads which are formed with flat lateral faces parallel to each other and to the direction of piston reciprocation, the piston heads being so shaped that the lateral surface of each piston head between one lateral extremity of the pair of flats is spaced further from the longitudinal piston axis than is the corresponding surface between the other lateral extremity of the pair of flats so as to preclude incorrect assembly, and bosses so located on the inner faces of said plates that the inner ends of the bosses lie opposite to the said flat lateral faces on the piston heads and prevent the latter from turning, which piston heads also have endwise-directed faces in such position as to lie opposite to the curved faces of the bosses on the rock arm and to maintain engagement with the bosses during the rotary movement of the arm and the corresponding reciprocatory movement of the piston heads.

4. In a shock absorber in which fluid friction is employed for damping, the combination of a casing embodying two fluid containers, two piston heads, one reciprocable in each container, and each piston head having a perforation extending through it from end to end, a metering rod enclosed within said casing, which rod reaches into the perforations in such manner that the piston heads reciprocate along the metering rod, a single sleeve interposed between the metering rod and the perforations in the piston heads in such manner that the opposed surfaces of the sleeve and the metering rod provide between them a restricted passage connecting the said fluid containers, through which passage the fluid is forced by the said piston heads, said sleeve being a slack fit in the bore of the piston heads, means for mounting the piston heads separately on the sleeve so that the latter shall partake of the reciprocation of the piston heads, spring means for urging the piston heads towards each other along the sleeve, a flexible sealing washer between each end of the sleeve, and the corresponding end of the piston head to prevent leakage between the sleeve and the piston heads while permitting these parts to adjust themselves to any errors in alignment which may develop, which washers are so located as to be subjected to the said endwise spring pressure, a rock shaft which transmits the shock and the damping effort, means for mounting said shaft in the casing, a barrel, means for mounting said barrel on the rock shaft inside the casing, two parallel plates together constituting with the barrel a rock arm, which plates are located one at each end of said barrel in such manner that they reach out to embrace the adjacent ends of the piston heads which are formed with flat lateral faces parallel to each other and to the direction of piston reciprocation, and bosses so located on the inner faces of said plates that the inner ends of the bosses lie opposite to the said flat lateral faces on the piston heads and prevent the latter from turning, which piston heads also have endwise-directed faces in such position as to lie opposite to the curved faces of the bosses on the rock arm and to maintain engagement with the bosses during the rotary movement of the arm and the corresponding reciprocatory movement of the piston heads.

ERNEST WILLIAM JOHNSON.